United States Patent
Wilczak et al.

(10) Patent No.: US 10,189,940 B2
(45) Date of Patent: Jan. 29, 2019

(54) PROCESS FOR PROVIDING POLYMERS COMPRISING HEXAGONAL BORON NITRIDE

(71) Applicant: PepsiCo, Inc., Purchase, NY (US)

(72) Inventors: Wojciech A. Wilczak, Jersey City, NJ (US); Lee M. Nicholson, Katonah, NY (US)

(73) Assignee: PepsiCo, Inc., Purchase, NY (US)

( * ) Notice: Subject to any disclaimer, the term of this patent is extended or adjusted under 35 U.S.C. 154(b) by 191 days.

(21) Appl. No.: 15/257,592

(22) Filed: Sep. 6, 2016

(65) Prior Publication Data

US 2017/0066871 A1 Mar. 9, 2017

Related U.S. Application Data

(60) Provisional application No. 62/216,128, filed on Sep. 9, 2015.

(51) Int. Cl.
| | |
|---|---|
| *C08G 63/183* | (2006.01) |
| *C08K 9/00* | (2006.01) |
| *B65D 1/02* | (2006.01) |
| *B65D 85/72* | (2006.01) |
| *C08K 3/38* | (2006.01) |

(52) U.S. Cl.
CPC ......... *C08G 63/183* (2013.01); *B65D 1/0215* (2013.01); *B65D 85/72* (2013.01); *C08K 9/00* (2013.01); *C08G 2390/00* (2013.01); *C08K 3/38* (2013.01)

(58) Field of Classification Search
USPC ........................................ 524/404, 420, 428
See application file for complete search history.

(56) References Cited

U.S. PATENT DOCUMENTS

| | | | |
|---|---|---|---|
| 6,160,042 A | 12/2000 | Ishida | |
| 8,303,922 B2 | 11/2012 | Lin et al. | |
| 8,771,583 B2 | 7/2014 | Sequeira | |
| 2010/0291365 A1* | 11/2010 | Lin | C08K 9/04 428/220 |
| 2011/0086965 A1 | 4/2011 | Zhi et al. | |
| 2014/0077125 A1 | 3/2014 | Lin et al. | |
| 2014/0077138 A1 | 3/2014 | Taha-Tijerina et al. | |
| 2016/0325994 A1* | 11/2016 | Qu | C01B 21/0648 |

FOREIGN PATENT DOCUMENTS

WO   WO 2014/130687 A1   8/2014

OTHER PUBLICATIONS

Notification of Transmittal of the International Search Report and the Written Opinion of the International Searching Authority, or the Declaration dated Feb. 3, 2017, issued in International Application No. PCT/US2016/049497 filed Aug. 30, 2016.
Lee et al., "Properties of Waterbourne Polyurethane/Functionalized Graphene Sheet Nanocomposites Prepared by an in situ Method," *Macromolecular Chemistry*, Aug. 2009, vol. 210, p. 1247-1254.
Huang, C., et al., "Stable colloidal boron nitride nanosheet dispersion and its potential application in catalysis," *J. Mater. Chem. A* 1(39):12192-12197, The Royal Society of Chemistry, England (2013).
Pierret, A., et al., "Excitonic recombinations in hBN: from bulk to exfoliated layers," *Physical Review B* 89:035414, American Physical Society, United States, 8 pages (2014).

* cited by examiner

*Primary Examiner* — Terressa Boykin
(74) *Attorney, Agent, or Firm* — Sterne, Kessler, Goldstein & Fox P.L.L.C.

(57) ABSTRACT

Provided herein are polymer (e.g., PET) compositions comprising exfoliated hexagonal boron nitride (h-BN), methods of preparing and methods of using thereof. The methods for preparing the polymer (e.g., PET) compositions include providing a reactant mixture comprising exfoliated hexagonal boron nitride (h-BN) and a first monomeric or oligomeric reactant, and polymerizing the first monomeric or oligomeric reactant. Also provided are containers (e.g., bottles) prepared using the polymer (e.g., PET) compositions comprising exfoliated h-BN.

20 Claims, No Drawings

PROCESS FOR PROVIDING POLYMERS COMPRISING HEXAGONAL BORON NITRIDE

This application incorporates by reference in its entirety U.S. Provisional Application No. 62/216,128, filed Sep. 9, 2015.

FIELD AND BACKGROUND OF THE INVENTION

Various embodiments described herein relate to a polymer composition comprising exfoliated hexagonal boron nitride, methods of preparing and using thereof.

Lightweighting of carbonated soft drink poly(ethylene terephthalate) containers leads to a decrease in shelf-life of the product due to loss of carbonation through thinner bottle walls. The currently available barrier coatings such as Plasmax or Actis require significant capital investment and do not work well when carbonation level of the drink inside the bottle is high. Further, multi-layer bottles are expensive and can have recyclability issues. Thus, containers with improved characteristics such as being less permeable to gas (e.g., carbon dioxide) are in need.

BRIEF SUMMARY OF THE INVENTION

In one aspect, a method of preparing a polymer composition is provided, comprising exfoliated hexagonal boron nitride (h-BN). In some embodiments, the method comprises a) providing a reactant mixture comprising a first monomeric or oligomeric reactant and exfoliated hexagonal boron nitride; and b) polymerizing the first monomeric or oligomeric reactant in the reactant mixture to form the polymer composition that includes dispersed platelets of exfoliated hexagonal boron nitride, wherein the polymer is selected from the group consisting of polyesters, polyamides, polyimides, polyurethanes, polycarbonates, and mixtures and copolymers thereof. Suitable polyesters, polyamides, polyimides, polyurethanes, and polycarbonates are described herein.

In some embodiments, providing a reactant mixture comprises exfoliating hexagonal boron nitride in a solvent to form a boron nitride suspension; and including the exfoliated h-BN suspension in the reactant mixture. In some embodiments, exfoliating the hexagonal boron nitride comprises sonication, ball milling, shearing, wedge-based mechanical exfoliation, or a combination thereof. In some embodiments, the exfoliated hexagonal boron nitride forms platelets having an average thickness of 5 to 10 monolayers. In some embodiments, the exfoliated hexagonal boron nitride forms platelets having an average thickness of 5 to 20 monolayers. In some embodiments, the exfoliated hexagonal boron nitride has a mean aspect ratio of 100 to 2000. In some embodiments, the reactant mixture is substantially free of agglomerated hexagonal boron nitride as determined by scanning electron microscope.

In some embodiments, the solvent comprises the first monomeric or oligomeric reactant. In some embodiments, the first monomeric or oligomeric reactant is selected from the group consisting of ethylene glycol, terephthalic acid, isophthalic acid, dimethyl terephthalate, diethyl terephthalate, cyclohexane dimethanol, an oligomer having Formula I,

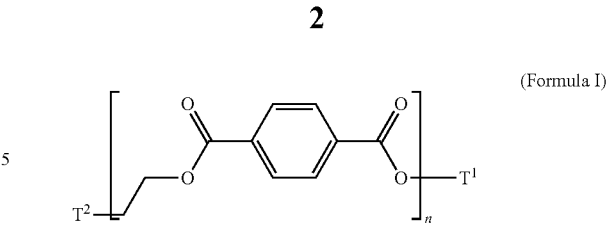

(Formula I)

wherein $T^1$ is H, methyl, ethyl, or 2-hydroxyethyl; $T^2$ is H, OH, or

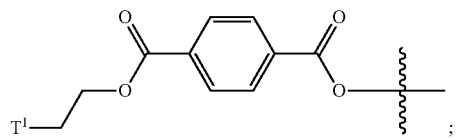

and n is 1-6;

and a combination thereof. In some embodiments, the solvent is ethylene glycol and the polymer is homopolymer or copolymer of poly(ethylene terephthalate). In some embodiments, the reactant mixture is substantially free of a non-polymerizing solvent.

In some embodiments, the reactant mixture further comprises a second monomeric or oligomeric reactant, a polymerization catalyst, or a combination thereof. In these embodiments, providing the reactant mixture can comprise adding the second monomeric or oligomeric reactant, the polymerization catalyst, or the combination thereof, to the solvent, after exfoliating the hexagonal boron nitride in the solvent.

In one aspect, a novel reactant mixture comprising exfoliated hexagonal boron nitride is provided. In some embodiments, the reactant mixture comprises a first monomeric or oligomeric reactant, a second monomeric or oligomeric reactant, and exfoliated hexagonal boron nitride. In some embodiments, the reactant mixture further comprises a polymerization catalyst. In some embodiments, the reactant mixture comprises the exfoliated h-BN suspension in ethylene glycol, a terephthalic agent chosen from terephthalic acid, dimethyl terephthalate, or diethyl terephthalate, and a polymerization catalyst. In some embodiments, the reactant mixture consists essentially of the exfoliated h-BN suspension in ethylene glycol, a terephthalic agent chosen from terephthalic acid, dimethyl terephthalate, or diethyl terephthalate, and a polymerization catalyst.

In some embodiments, the reactant mixture comprises a first monomeric or oligomeric reactant, a second monomeric or oligomeric reactant, and exfoliated hexagonal boron nitride, wherein the first monomeric or oligomeric reactant forms a polyester upon polymerization, optionally with the second monomeric or oligomeric reactant. In some embodiments, the polyester is a homopolymer or copolymer of poly(ethylene terephthalate), poly(ethylene naphthalate) or poly(ethylene furanonate). In some embodiments, the reactant mixture is substantially free of agglomerated hexagonal boron nitride as determined by scanning electron microscope. In some embodiments, the first monomeric or oligomeric reactant is ethylene glycol. In some embodiments, the second monomeric or oligomeric reactant is terephthalic acid, dimethyl terephthalate, or diethyl terephthalate. In some embodiments, the reactant mixture is substantially free of a non-polymerizing solvent. In some embodiments, the exfoliated hexagonal boron nitride is present in an amount of 0.01% to 10% by weight of the reactant mixture.

In one aspect, a novel polymer (e.g., PET) composition is provided, comprising exfoliated hexagonal boron nitride prepared by the methods described herein. In some embodiments, the exfoliated h-BN is present in an amount of about 0.01% to about 10% by weight of the polymer (e.g., PET) composition.

In one aspect, a container is provided, prepared from a polymer composition comprising exfoliated hexagonal boron nitride prepared by the methods described herein. In some embodiments, the polymer is a homopolymer or copolymer of poly(ethylene terephthalate).

In one aspect, a method of reducing gas exchange between a sealed container and its external environment is provided, comprising preparing the sealed container using from a polymer composition comprising exfoliated hexagonal boron nitride prepared by the methods described herein. In some embodiments, the polymer is a homopolymer or copolymer of poly(ethylene terephthalate). In some embodiments, the oxygen permeability of the sealed container is reduced by about 10% or more when compared to the oxygen permeability of a substantially identical container except without the exfoliated hexagonal boron nitride.

In one aspect, a method of increasing shelf life of a food item is provided, comprising sealing the food item in a container, wherein the container is prepared using a polymer composition comprising exfoliated hexagonal boron nitride prepared by the methods described herein. In some embodiments, the polymer is a homopolymer or copolymer of poly(ethylene terephthalate). In some embodiments, the oxygen permeability of the sealed container comprising the food item is reduced by about 10% or more when compared to the oxygen permeability of a substantially identical container except without the exfoliated hexagonal boron nitride. In some embodiments, the food item is a carbonated soft drink. In some embodiments, the food item is a tea drink. In some embodiments, the food item is a dairy product. In some embodiments, the food item is an alcoholic drink.

DETAILED DESCRIPTION OF THE INVENTION

Definitions

Unless specifically stated or obvious from context, as used herein, the term "about" is understood as within a range of normal tolerance in the art, for example, within 20% of the stated value, for example, "about 20" includes 16 to 24, and "about 20%" includes 16% to 24% (not 0% to 40%). As used herein, "about" a specific value also includes the specific value, for example, about 10% includes 10%.

Open terms such as "include," "including," "contain," "containing" and the like mean "comprising." These open-ended transitional phrases are used to introduce an open ended list of elements, method steps or the like that does not exclude additional, unrecited elements or method steps.

The transitional phrase "consisting of" and variations thereof excludes any element, step, or ingredient not recited, except for impurities ordinarily associated therewith.

The transitional phrase "consists essentially of," or variations such as "consist essentially of" or "consisting essentially of," excludes any element, step, or ingredient not recited except for those that do not materially change the basic or novel properties of the specified method, structure or composition.

Also, the indefinite articles "a" and "an" preceding an element or component of the invention are intended to be nonrestrictive regarding the number of instances, i.e., occurrences of the element or component. Therefore "a" or "an" should be read to include one or at least one, and the singular word form of the element or component also includes the plural unless the number is obviously meant to be singular.

The terms "invention" or "present invention" as used herein are non-limiting terms and are not intended to refer to any single embodiment of the particular invention but encompass all possible embodiments as described in the application.

As used herein, a "homopolymer" refers to a polymer that contains only a single type of repeat unit. For example, a polymer formed from only ethylene glycol and terephthalic acid would be a homopolymer of poly(ethylene terephthalate).

As used herein, a "copolymer" refers to a polymer that contains a mixture of repeat units. For example, a polymer formed from polymerization of ethylene glycol and cyclohexane dimethanol and terephthalic acid would be a copolymer of poly(ethylene terephthalate). Similarly, a polymer formed from polymerization of ethylene glycol and terephthalic acid and isophthalic acid would also be a copolymer of poly(ethylene terephthalate).

As used herein, the term "non-polymerizing solvent" refers to a solvent that is either inert or does not participate in the polymerization reaction to form a part of the repeat unit of a polymer as described herein. For example, non-polymerizing solvents include solvents that have no reactive functional group under the polymerization condition, for example, tetrahydrofuran (THF) is generally not reactive under the polymerization condition for the synthesis of PET and therefore can be a non-polymerizing solvent. Non-polymerizing solvents also include solvents that have a reactive functional group but do not form a part of the repeat unit of the polymer under the polymerization condition. For example, a monohydric alcohol, such as isopropanol or ethanol, may react with terephthalic acid or esters thereof under the polymerization condition with ethylene glycol, but it cannot extend the polymeric chain and does not form part of the repeat unit of poly(ethylene terephthalate). Thus, as used herein, isopropanol or ethanol is also a non-polymerizing solvent.

As used herein, "exfoliated hexagonal boron nitride" or "exfoliated h-BN" refers to hexagonal boron nitride platelets that are substantially exfoliated, for example, having an average thickness of 1 to 50 monoatomic layers (monolayers), or about 0.3 nm to about 15 nm, as determined by transmission electron microscopy, scanning electron microscopy, X-ray photoelectron spectroscopy, or X-ray powder diffraction. See e.g., Pierret A., et al., "Excitonic recombinations in hBN: from bulk to exfoliated layers," hal-00833437v1 (2013). Unless otherwise specified, scanning electron microscopy is used for determining average thickness of exfoliated h-BN platelets. As understood by those skilled in the art, each monoatomic layer of h-BN is about 0.3 nm thick. In some embodiments, the exfoliated h-BN platelets have an average thickness of 5 to 10 monoatomic layers. In some embodiments, the exfoliated h-BN platelets have an average thickness of 5 to 20 monoatomic layers. As used herein, "exfoliating" h-BN includes any process for generating exfoliated h-BN.

As used herein, "agglomerated hexagonal boron nitride" or "agglomerated h-BN" refers to a collection of boron nitride platelets bonded together. For example, agglomerated h-BN in general has more than 150 monoatomic layers of h-BN, or more than 50 nm thick. Further, those skilled in the art can readily differentiate agglomerated h-BN particles from exfoliated h-BN by transmission electron microscopy, scanning electron microscopy, X-ray photoelectron spectroscopy, or X-ray powder diffraction. Unless otherwise specified, scanning electron microscopy is used for differentiating agglomerated h-BN particles from exfoliated h-BN.

As used herein, "substantially identical container(s)" refer to containers that have substantially identical container weight, shape, and volume, and are made from substantially the same material (e.g., same polymer), except otherwise specified, and with substantially same container wall thickness. For example, as described herein, for comparison purposes, two substantially identical containers, one made with PET composition comprising exfoliated h-BN and another one made also with PET composition but without exfoliated h-BN, and the characteristics of PET are substantially the same, can be used for oxygen permeability analysis.

As used herein, a functional equivalent of a dicarboxylic acid refers to a derivative (e.g., an ester) of the dicarboxylic acid that can react with, for example, a diol or a diamine, to form a polymer having the same repeat unit as that from a reaction of the dicarboxylic acid and the diol or diamine.

Polimerization Process Using Reactant Mixture Comprising Exfoliated h-BN

Polymer compositions comprising exfoliated h-BN can be prepared by incorporating isolated, dry exfoliated h-BN into molten polymers (e.g., PET). However, isolation and drying of the exfoliated h-BN can lead to re-agglomeration of exfoliated h-BN. Further, incorporation of exfoliated h-BN into molten polymers generally leads to a poor dispersion of h-BN within the polymers. In contrast, without being bound by theories, by using a reactant mixture comprising exfoliated h-BN (e.g., exfoliate h-BN in a reactant solvent (e.g., ethylene glycol)) and directly polymerizes the reactant mixture to form a polymer (e.g., PET), the exfoliated h-BN does not need to be isolated, e.g., from a solvent (e.g., ethylene glycol). Thus, this process reduces chances of re-agglomeration. Further, by not isolating and drying the exfoliated h-BN and by directly polymerizing the reactant mixture, the final polymer formed has a better dispersion of h-BN in the polymer composition (e.g., a PET composition).

In one aspect, a method of preparing a polymer composition using a reactant mixture comprising exfoliated h-BN is provided. In some embodiments, the method comprises a) providing a reactant mixture comprising a first monomeric or oligomeric reactant and exfoliated hexagonal boron nitride; and b) polymerizing the first monomeric or oligomeric reactant in the reactant mixture to form the polymer composition that includes dispersed platelets of exfoliated hexagonal boron nitride. In some embodiments, the polymer is selected from the group consisting of polyesters, polyamides, polyimides, polyurethanes, polycarbonates, and mixtures and copolymers thereof.

In some embodiments, the method is directed to preparing a polyester composition comprising exfoliated h-BN. Polyesters suitable for the method include any of those known in the art. Non-limiting examples of suitable polyesters include polyesters derived from a diol (e.g., ethylene glycol, diethylene glycol, triethylene glycol, tetraethylene glycol, propylene glycol, dipropylene glycol, tripropylene glycol, 1,3-butanediol, 1,4-butanediol, 1,3-propanediol, neopentyl glycol, 1,6-hexanediol, 1,4-cyclohexanedimethanol, etc.) or a polyol (e.g., glycerol, trimethylolpropane, pentaerythritol, sugar alcohols, etc) and a dicarboxylic acid or functional equivalent thereof (e.g., esters thereof) (e.g., terephthalic acid, furandicarboxylic acid, naphthalene dicarboxylic acid, succinic acid, adipic acid, etc.) and polyesters derived from a hydroxycarboxylic acid (e.g., hydroxybutanoic acid, hydroxypentanoic acid, hydroxybenzoic acid, hydroxynaphthalenic carboxylic acid, glycolic acid, etc.) or a lactone (e.g., butyrolactone, valerolactone, caprolactone, etc.).

In some embodiments, the polyester is a homopolymer or a copolymer derived from a diol and a dicarboxylic acid or functional equivalent thereof (e.g., esters thereof). In some embodiments, the diol is ethylene glycol, diethylene glycol, triethylene glycol, tetraethylene glycol, propylene glycol, dipropylene glycol, tripropylene glycol, 1,3-butanediol, 1,4-butanediol, 1,3-propanediol, neopentyl glycol, 1,6-hexanediol, 1,4-Cyclohexanedimethanol. In some embodiments, the diol is ethylene glycol, 1,4-butanediol, or 1,3-propanediol. In any of the embodiments described herein, the diol can be ethylene glycol. In some embodiments, the dicarboxylic acid or functional equivalent thereof (e.g., esters thereof) is an aromatic diacid or esters thereof (e.g., terephthalic acid, furandicarboxylic acid, naphthalene dicarboxylic acid, or esters thereof). In some embodiments, the dicarboxylic acid or functional equivalent thereof (e.g., esters thereof) is terephthalic acid or esters thereof. In some embodiments, the polyester is a homopolymer or copolymer of poly(ethylene terephthalate), poly(butylene terephthalate), poly(trimethylene terephthalate), poly(ethylene naphthalate), poly(ethylene furanate), poly(ethylene adipate), or poly(butylene succinate). In some embodiments, the polyester is a homopolymer of poly(ethylene terephthalate). In some embodiments, the polyester is a copolymer of poly(ethylene terephthalate).

In some embodiments, the polyester is a homopolymer or copolymer of polyglycolide, polylactic acid, polycaprolactone, polyhydroxyalkanate (e.g., polyhydroxybutyrate, polyhydroxyvalerate), vectran, mixtures thereof, and copolymers thereof.

In some embodiments, the method is directed to preparing a polyamide, polyimide, polyurethane, or polycarbonate composition comprising exfoliated h-BN.

Suitable polyamides include any of those known in the art. Nonlimiting examples of suitable polyamides include aliphatic polyamides (e.g., poly(hexano-6-lactam), poly(hexamethylene adipamide, poly(m-xylylene adipamide)), polyphthalamide (e.g., polyamide derived from hexamethylenediamine and terephthalic acid), and polyaromatic amides (e.g., poly-p-phenylene terephthalamides, polymetaphenylene isophthalamides). Certain polyamides are commercially available for use in packaging. For example, Mitsubishi Gas Chemical Co., Ind. produces a wide range of polyamides from m-xylylenediamine (MXDA). Commercially available Nylon MXD6 is a crystalline polyamide produced by polycondensation of MXDA with adipic acid, which was known to have gas barrier property and was used as material in packaging. These polyamides can also be prepared by the method described herein. In some embodiments, the method is directed to preparing a polyamide, wherein the polyamide is derived from a diamine and a dicarboxylic acid or functional equivalent thereof (e.g., esters thereof). In some embodiments, the dicarboxylic acid is adipic acid. In some embodiments, the diamine is meta-xylylene diamine. In some embodiments, the polyamide is a homopolymer of copolymer of poly(m-xylylene adipamide). In some embodiments, the polyamide is characterized by a formula of

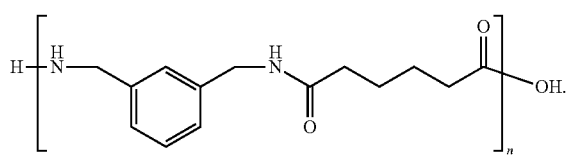

In some embodiments, the polyamide is characterized by a repeat unit of

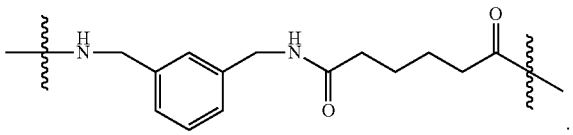

Suitable polyimides include any of those known in the art. Nonlimiting examples of suitable polyimides include polyimides derived from 4,4'-diaminodiphenyl ether ("DAPE") (e.g., poly-oxydiphenylene-pyromellitimide), meta-phenylenediamine ("MDA"), or 3,3-diaminodiphenylmethane, and a dicarboxylic anhydride.

Suitable polyurethanes include any of those known in the art. Nonlimiting examples of suitable polyurethanes include polyurethanes derived from a diol (e.g., ethylene glycol, diethylene glycol, triethylene glycol, tetraethylene glycol, propylene glycol, dipropylene glycol, tripropylene glycol, 1,3-butanediol, 1,4-butanediol, 1,3-propanediol, neopentyl glycol, 1,6-hexanediol, 1,4-cyclohexanedimethanol, hydroquinone bis(2-hydroxyethyl) ether, etc.) and an isocyanate (e.g., toluene diisocyanate, methylene diphenyl diisocyanate, 1,6-hexamethylene diisocyanate, 1-isocyanato-3-isocyanatomethyl-3,5,5-trimethyl-cyclohexane, 4,4'-diisocyanato dicyclohexylmethane, etc.).

Suitable polycarbonates include any of those known in the art. Nonlimiting examples of suitable polycarbonates include polycarbonates derived from a bisphenol (e.g., bisphenol A) and a carbonyl source (e.g., phosgene).

Reactant Mixture

Various processes are suitable for providing the reactant mixture for the methods described herein. In some embodiments, providing the reactant mixture comprises: exfoliating h-BN in a solvent to form a boron nitride suspension; and including the exfoliated h-BN suspension in the reactant mixture. Thus, the h-BN is not isolated from the solvent in which it is exfoliated. Other processes for providing the reactant mixture can also be used, for example, if the processes do not introduce agglomerated h-BN in the reactant mixture.

The exfoliated h-BN in the reactant mixture can be characterized by its average thickness. As understood by those skilled in the art, the term exfoliated h-BN does not necessary implicate that it consists of only one monoatomic layer. In any of the embodiments described herein, the exfoliated h-BN in the reactant mixture is characterized by having an average thickness of 1-50 (e.g., 1, 2, 3, 4, 5, 6, 7, 8, 9, 10, 12, 14, 16, 18, 20, 25, 30, 35, 40, 45, 50, or any ranges between the specified numeric values) monoatomic layers. In some embodiments, the exfoliated h-BN in the reactant mixture is characterized by having an average thickness of 5-10 monoatomic layers. In some embodiments, the exfoliated h-BN in the reactant mixture is characterized by having an average thickness of 5-20 monoatomic layers. In any of the embodiments described herein, the reactant mixture is substantially free of agglomerated h-BN. The average thickness of h-BN in the reactant mixture can be measured by known methods in the art, for example, by using scanning electron microscope. The extent of agglomerated h-BN in the reactant mixture can also be determined by known methods in the art, for example, by using scanning electron microscope. In some embodiments, agglomerated h-BN is not observed in the reactant mixture using scanning electron microscope. In some embodiments, agglomerated h-BN is not observed in the reactant mixture using transmission electron microscopy, scanning electron microscopy, X-ray photoelectron spectroscopy, or X-ray powder diffraction.

The exfoliated h-BN in the reactant mixture can also be characterized by its mean aspect ratio. In some embodiments, the exfoliated h-BN has a mean aspect ratio of about 100 to about 2000 (e.g., about 100, about 200, about 300, about 400, about 500, about 600, about 700, about 800, about 900, about 1000, about 1100, about 1200, about 1300, about 1400, about 1500, about 1600, about 1700, about 1800, about 1900, about 2000, or any ranges between the specified numeric values). In some embodiments, the exfoliated h-BN has a mean aspect ratio of less than 100. In some embodiments, the exfoliated h-BN has a mean aspect ratio of more than 2000 (e.g., 2500, 3000, or more). In some embodiments, the exfoliated h-BN has a mean aspect ratio of about 1000 to about 2000. In some embodiments, the exfoliated h-BN has a mean aspect ratio of about 1300.

Various amounts of exfoliated h-BN can be included in the reactant mixture. In some embodiments, the exfoliated h-BN is present in an amount of about 0.01% to about 10% (e.g., about 0.01%, about 0.05%, about 0.1%, about 0.5%, about 1%, about 2%, about 3%, about 4%, about 5%, about 6%, about 7%, about 8%, about 9%, about 10%, or any ranges between the specified numeric values) by weight of the reactant mixture. In some embodiments, the exfoliated h-BN is present in an amount of about 0.01% to about 5% by weight of the reactant mixture. In some embodiments, the exfoliated h-BN is present in an amount of about 5% to about 10% by weight of the reactant mixture. In some embodiments, the exfoliated h-BN is present in an amount of less than 0.01% (e.g., about 0.001%, or about 0.005%) by weight of the reactant mixture. In some embodiments, the exfoliated h-BN is present in an amount of more than 10% (e.g., about 15%, about 20%, or more) by weight of the reactant mixture.

Suitable methods to obtain exfoliated h-BN for use in the reactant mixture include any of the exfoliation methods known in the art. Nonlimiting examples of suitable methods include sonication, ball milling, shearing, wedge-based mechanical exfoliation, or a combination thereof. In some embodiments, exfoliating the h-BN comprises sonication. In some embodiments, exfoliating the h-BN comprises ball milling. In some embodiments, exfoliating the h-BN comprises a combination of ball milling and sonication. For example, the h-BN can be first ball-milled and then sonicated. Some examples of exfoliation methods can be found in Xu C., et al., *J. Mater. Chem. A*, 1(39):12192 (2013), and U.S. Pat. No. 8,303,922.

When a solvent is used for exfoliating the h-BN, the h-BN can be exfoliated in the solvent to form an h-BN suspension, which is then included in the reactant mixture without being isolated from the solvent. In some embodiments, the solvent comprises the first monomeric or oligomeric reactant. In some embodiments, the solvent comprising the first monomeric or oligomeric reactant further comprises an inert non-polymerizing solvent (e.g., THF). In some embodiments, the solvent comprising the first monomeric or oligomeric reactant further comprises a monohydric alcohol (e.g., isopropanol, ethanol). In some embodiments, the solvent does not include a monohydric alcohol. In some embodiments, the solvent does not include a non-polymerizing solvent. In some embodiments, the solvent consists essentially of the first monomeric or oligomeric reactant. In some embodiments, the solvent is the first monomeric or oligomeric reactant. In any of the embodiments described herein, the solvent can include a diol (e.g., ethylene glycol). In any of the embodiments described herein, the solvent can be ethylene glycol. In some embodiments, exfoliating the h-BN comprises sonication in the solvent (e.g., ethylene glycol).

In any of the embodiments described herein, where the method is directed to preparing a polyamide, the solvent can include a dicarboxylic acid (e.g., adipic acid). In some embodiments, the solvent is water. In some embodiments, exfoliating the h-BN comprises sonication in water. In some embodiments, the first monomeric or oligomeric reactant (e.g., adipic acid) is added to the water comprising exfoliated h-BN. In some embodiments, the solvent is an aqueous solution of adipic acid. In some embodiments, exfoliating the h-BN comprises sonication in the aqueous solution of adipic acid. In some embodiments, the aqueous solution comprising adipic acid and exfoliated h-BN is used in polyamide synthesis without removing water. In some embodiments, the aqueous solution comprising adipic acid and exfoliated h-BN is used in polyamide synthesis after removing water. In some embodiments, exfoliating the h-BN comprises sonication in melted adipic acid.

Suitable first monomeric or oligomeric reactants in the reactant mixture include any of those known to be useful in preparing the respective polymer. For example, in some embodiments, the first monomeric or oligomeric reactant can be any of those suitable for preparing a polyester (e.g., any of those described herein, e.g., poly(ethylene terephthalate)). In some embodiments, the first monomeric or oligomeric reactant can be any of those suitable for preparing a homopolymer or copolymer of poly(ethylene terephthalate), poly(butylene terephthalate), poly(trimethylene terephthalate), poly(ethylene naphthalate), poly(ethylene furanate), poly(ethylene adipate), or poly(butylene succinate). In some embodiments, the first monomeric or oligomeric reactant can be any of those suitable for preparing a homopolymer or copolymer of poly(ethylene terephthalate), poly(ethylene naphthalate), or poly(ethylene furanate). In some embodiments, the first monomeric or oligomeric reactant can also be any of those suitable for preparing a polyamide (e.g., any of those described herein, e.g., poly(m-xylylene adipamide). In some embodiments, the first monomeric or oligomeric reactant is adipic acid, metaxylylene diamine, an oligomer formed from adipic acid and metaxylylene diamine, or a combination thereof. In some embodiments, the first monomeric or oligomeric reactant is adipic acid. In some embodiments, the first monomeric or oligomeric reactant is metaxylylene diamine. In some embodiments, the first monomeric or oligomeric reactant is an oligomer formed from adipic acid and metaxylylene diamine.

In a preferred embodiment, the first monomeric or oligomeric reactant is suitable for preparing a homopolymer or copolymer of poly(ethylene terephthalate). In some embodiments, the first monomeric or oligomeric reactant is selected from the group consisting of ethylene glycol, terephthalic acid, isophthalic acid, dimethyl terephthalate, diethyl terephthalate, cyclohexane dimethanol, an oligomer having Formula I,

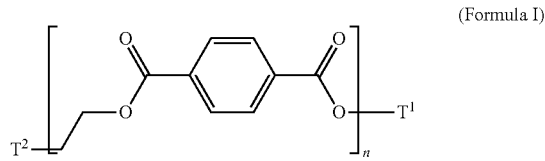
(Formula I)

wherein $T^1$ is H, methyl, ethyl, or 2-hydroxyethyl; $T^2$ is H, OH, or

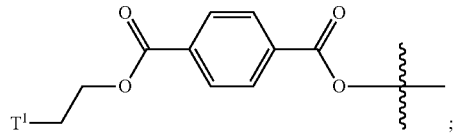

and n is 1-6; and a combination thereof. In some embodiments, the first monomeric or oligomeric reactant is a diol. In some embodiments, the diol is ethylene glycol, diethylene glycol, triethylene glycol, tetraethylene glycol, propylene glycol, dipropylene glycol, tripropylene glycol, 1,3-butanediol, 1,4-butanediol, 1,3-propanediol, neopentyl glycol, 1,6-hexanediol, 1,4-cyclohexanedimethanol, or a mixture thereof. In some embodiments, the first monomeric or oligomeric reactant is ethylene glycol. In some embodiments, the first monomeric or oligomeric reactant is cyclohexane dimethanol (e.g., 1,4-cyclohexanedimethanol). In some embodiments, the first monomeric or oligomeric reactant is a mixture of ethylene glycol and cyclohexane dimethanol (e.g., 1,4-cyclohexanedimethanol). In some embodiments, the first monomeric or oligomeric reactant is included in the solvent in which the hexagonal boron nitride in exfoliated. In some embodiments, the first monomeric or oligomeric reactant is the solvent in which the hexagonal boron nitride in exfoliated. In some embodiments, the solvent includes ethylene glycol. In some embodiments, the solvent is the first monomeric or oligomeric reactant, which is ethylene glycol. In some embodiments, the solvent is ethylene glycol. In some embodiments, the solvent is ethylene glycol and the polymer is a homopolymer or copolymer of poly(ethylene terephthalate). In some embodiments, the solvent is ethylene glycol and the polymer is a homopolymer of poly(ethylene terephthalate). In some embodiments, the solvent is ethylene glycol and the polymer is a copolymer of poly(ethylene terephthalate).

The reactant mixture can further comprise a second monomeric or oligomeric reactant, which can polymerize with the first monomeric or oligomeric reactant to form the polymer. For example, for a polyester, the first monomeric or oligomeric reactant can be a diol (e.g., as described herein), and the second monomeric or oligomeric reactant can be a diacid or functional equivalent thereof (e.g., esters thereof) (e.g., as described herein). In some embodiments, the first monomeric or oligomeric reactant is ethylene glycol and the second monomeric or oligomeric reactant is a terephthalic agent (e.g., terephthalic acid or esters thereof). In some embodiments, the second monomeric or oligomeric reactant is selected from the group consisting of ethylene glycol, terephthalic acid, isophthalic acid, dimethyl terephthalate, diethyl terephthalate, cyclohexane dimethanol, an oligomer having Formula I,

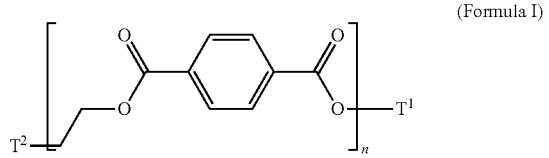

(Formula I)

wherein $T^1$ is H, methyl, ethyl, or 2-hydroxyethyl; $T^2$ is H, OH, or

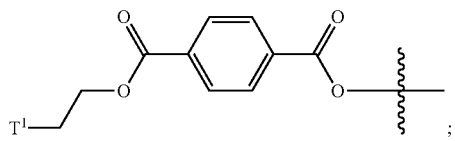

and n is 1-6; and a combination thereof. In a preferred embodiment, the first monomeric or oligomeric reactant is ethylene glycol and the second monomeric or oligomeric reactant is a terephthalic acid, dimethyl terephthalate, or diethyl terephthalate. In another preferred embodiment, the first monomeric or oligomeric reactant is ethylene glycol and the second monomeric or oligomeric reactant is a reaction product of ethylene glycol and terephthalic acid, dimethyl terephthalate, or diethyl terephthalate. In some embodiments, the reaction product is an oligomer having Formula I. In some embodiments, the reaction product is bis(2-hydroxyethyl) terephthalate. In some embodiments, where the method is for preparing a polyamide, the second monomeric or oligomeric reactant can be adipic acid, metaxylylene diamine, an oligomer formed from adipic acid and metaxylylene diamine, or a combination thereof. In some embodiments, where the method is for preparing a polyamide, one of the first and second monomeric or oligomeric reactants is adipic acid and the other is metaxylylene diamine.

The reactant mixture can further comprise a polymerization catalyst. Suitable polymerization catalysts include any of those known for a given polymer as described herein. For example, a reactant mixture for the preparation of a polyester can comprise a polymerization catalyst such as a metal based (e.g., manganese, antimony, titanium, or germanium based) catalyst or a non-metal based (e.g., polyphosphoric acid) catalyst for polyester formation. In some embodiments, the reactant mixture comprises a manganese based catalyst, e.g., manganese (II) ethanoate. In some embodiments, the reactant mixture comprises an antimony based catalyst, e.g., antimony (III) oxide. In some embodiments, the reactant mixture comprises a titanium based catalyst, e.g., titanium alkoxides. Other suitable polymerization catalysts are known in the art.

Where a second monomeric or oligomeric reactant, a polymerization catalyst, or a combination thereof, is included in the reactant mixture, providing the reactant mixture can comprise adding the second monomeric or oligomeric reactant, the polymerization catalyst, or the combination thereof, to the solvent, after exfoliating the hexagonal boron nitride in the solvent. However, it is also contemplated that the second monomeric or oligomeric reactant, the polymerization catalyst, or the combination thereof, is added to the solvent before exfoliating the hexagonal boron nitride in the solvent. In other words, the exfoliation can be performed in the solvent either in the presence or in the absence of the second monomeric or oligomeric reactant, the polymerization catalyst, or the combination thereof.

The reactant mixture described herein is by itself a novel composition. For example, in some embodiments, the reactant mixture comprises a first monomeric or oligomeric reactant, a second monomeric or oligomeric reactant, and exfoliated hexagonal boron nitride. In some embodiments, the first monomeric or oligomeric reactant forms a polyester upon polymerization, optionally with the second monomeric or oligomeric reactant. In some embodiments, the polyester is a homopolymer or copolymer of poly(ethylene terephthalate), poly(ethylene naphthalate) or poly(ethylene furanonate). In some embodiments, the first monomeric or oligomeric reactant forms a polyamide upon polymerization, optionally with the second monomeric or oligomeric reactant. In some embodiments, the polyamide is a homopolymer or copolymer of poly(m-xylylene adipamide). In some embodiments, the reactant mixture is substantially free of agglomerated hexagonal boron nitride as determined by scanning electron microscope. In some embodiments, the reactant mixture is substantially free of agglomerated hexagonal boron nitride as determined by transmission electron microscopy, scanning electron microscope, X-ray photoelectron spectroscopy, or X-ray powder diffraction. In some embodiments, the reactant mixture further comprises a polymerization catalyst. Suitable first and second monomeric or oligomeric reactants, exfoliated h-BN (including thickness and aspect ratio), and polymerization catalysts are described herein. In some embodiments, the first monomeric or oligomeric reactant is ethylene glycol. In some embodiments, the second monomeric or oligomeric reactant is terephthalic acid, dimethyl terephthalate, or diethyl terephthalate. In some embodiments, the first monomeric or oligomeric reactant is ethylene glycol and the second monomeric or oligomeric reactant is terephthalic acid, dimethyl terephthalate, or diethyl terephthalate. In some embodiments, the first monomeric or oligomeric reactant is adipic acid. In some embodiments, the second monomeric or oligomeric reactant is metaxylylene diamine. In some embodiments, the first monomeric or oligomeric reactant is adipic acid and the second monomeric or oligomeric reactant is metaxylylene diamine. In some embodiments, one of the first and second monomeric or oligomeric reactants is adipic acid and the other is metaxylylene diamine. In some embodiments, the reactant mixture is substantially free of a non-polymerizing solvent. In some embodiments, the exfoliated h-BN is present in an amount of about 0.01% to about 10% (e.g., about 0.01%, about 0.05%, about 0.1%, about 0.5%, about 1%, about 2%, about 3%, about 4%, about 5%, about 6%, about 7%, about 8%, about 9%, about 10%, or any ranges between the specified numeric values) by weight of the reactant mixture. Other suitable amounts of exfoliated h-BN are described herein.

After providing the reactant mixture, the method comprises a step of polymerizing the first monomeric or oligomeric reactant in the reactant mixture to form the polymer composition that includes dispersed platelets of exfoliated h-BN. In some embodiments, the step of polymerizing includes polymerizing the first monomeric or oligomeric reactant in the presence of a second monomeric or oligomeric reactant (e.g., as described herein), a polymerization catalyst (e.g., as described herein), or a combination thereof. Suitable methods for the polymerization are known in the art.

The polymer compositions with dispersed exfoliated h-BN produced by the methods described herein are also new. Without being bound by theories, it is believed that the polymer compositions formed by the methods described herein have a better dispersion of h-BN in the polymer compositions (e.g., a PET composition) compared to those prepared by incorporation of h-BN into molten polymers.

The amount of exfoliated h-BN incorporated into the polymer compositions described herein varies according to the amount of h-BN in the reactant mixture. In some embodiments, the exfoliated h-BN is present in an amount of about 0.01% to about 10% (e.g., about 0.01%, about 0.05%, about 0.1%, about 0.5%, about 1%, about 2%, about 3%, about 4%, about 5%, about 6%, about 7%, about 8%, about 9%, about 10%, or any ranges between the specified numeric values) by weight of the polymer composition. In some embodiments, the exfoliated h-BN is present in an amount of about 0.01% to about 5% by weight of the polymer composition. In some embodiments, the exfoliated h-BN is present in an amount of about 5% to about 10% by weight of the polymer composition. In some embodiments, the exfoliated h-BN is present in an amount of less than 0.01% (e.g., about 0.001%, or about 0.005%) by weight of the polymer composition. In some embodiments, the exfoliated h-BN is present in an amount of more than 10% (e.g., about 15%, about 20%, or more) by weight of the polymer composition.

The polymer composition provided herein can also optionally include an antioxidant or a radical scavenger. The antioxidant or radical scavenger can be included in the reactant mixture and therefore incorporated into the polymer composition upon polymerization. In some embodiments, the antioxidant or radical scavenger can be incorporated into the polymer after the polymerization. Suitable antioxidants or radical scavengers are known in the art.

Method of Preparing PET Composition Comprising Exfoliated h-BN

In certain preferred embodiments, a method of preparing a homopolymer or copolymer of poly(ethylene terephthalate) is provided. In some embodiments, the method comprises a) providing a reactant mixture comprising a first monomeric or oligomeric reactant and exfoliated hexagonal boron nitride; and b) polymerizing the first monomeric or oligomeric reactant in the reactant mixture to form the PET composition that includes dispersed platelets of exfoliated hexagonal boron nitride. In some embodiments, providing a reactant mixture comprises exfoliating hexagonal boron nitride in a solvent to form a boron nitride suspension; and including the exfoliated h-BN suspension in the reactant mixture. In some embodiments, the reactant mixture further comprises a second monomeric or oligomeric reactant. In some embodiments, the reactant mixture further comprises a polymerization catalyst. In some embodiments, the reactant mixture is substantially free of a non-polymerizing solvent. In some embodiments, the reactant mixture is substantially free of agglomerated hexagonal boron nitride as determined by scanning electron microscope. In some embodiments, the reactant mixture is substantially free of agglomerated hexagonal boron nitride as determined by transmission electron microscopy, scanning electron microscope, X-ray photoelectron spectroscopy, or X-ray powder diffraction. Suitable first and second monomeric or oligomeric reactants, solvent, exfoliated h-BN (including thickness and aspect ratio), and polymerization catalysts are described herein.

In some embodiments, the solvent is the first monomeric or oligomeric reactant, which is ethylene glycol and the h-BN is exfoliated in the solvent (e.g., through sonication). The exfoliated h-BN in ethylene glycol does not have to be used immediately for the polymerization step. For example, in certain embodiments, the exfoliated h-BN can be stored in ethylene glycol for a certain period of time before being employed in the polymerization step. However, when it is determined that a significant amount of the exfoliated h-BN platelets in ethylene glycol re-agglomerate, a second exfoliation step (e.g., by sonication) is carried out before the polymerization step, or the ethylene glycol with re-agglomerated h-BN is not used.

In some embodiments, the second monomeric or oligomeric reactant is added to the solvent, after exfoliating the hexagonal boron nitride in the solvent. In some embodiments, the second monomeric or oligomeric reactant is a terephthalic agent chosen from terephthalic acid, dimethyl terephthalate, or diethyl terephthalate. In some embodiments, the second monomeric or oligomeric reactant is a reaction product of ethylene glycol and a terephthalic agent chosen from terephthalic acid, dimethyl terephthalate, or diethyl terephthalate. In some embodiments, the reaction product is bis(2-hydroxyethyl) terephthalate. In some embodiments, the polymerization catalyst is added to the solvent, after exfoliating the hexagonal boron nitride in the solvent.

In some embodiments, the reactant mixture comprises the exfoliated h-BN suspension in ethylene glycol, a terephthalic agent chosen from terephthalic acid, dimethyl terephthalate, or diethyl terephthalate, and a polymerization catalyst. In some embodiments, reactant mixture consists essentially of the exfoliated h-BN suspension in ethylene glycol, a terephthalic agent chosen from terephthalic acid, dimethyl terephthalate, or diethyl terephthalate, and a polymerization catalyst.

In some embodiments, the reactant mixture comprises the exfoliated h-BN suspension in ethylene glycol, bis(2-hydroxyethyl) terephthalate, and a polymerization catalyst. In some embodiments, the reactant mixture consists essentially of the exfoliated h-BN suspension in ethylene glycol, bis(2-hydroxyethyl) terephthalate, and a polymerization catalyst.

Suitable methods for polymerizing the reactant mixture include any of those known in the art. Polymerization reaction parameters such as amount/concentration of reactants and catalysts, temperature, pressure, mixing speed, reaction duration, etc. are well known in the art for PET synthesis. For example, in some embodiments, the reactant mixture comprises ethylene glycol and terephthalic acid, polymerizing the reactant mixture by esterification of ethylene glycol and terephthalic acid can be conducted directly at moderate pressure (e.g., 2.7-5.5 bar) and high temperature (e.g., 220°-260° C.) to form PET. In some embodiments, the reactant mixture comprises ethylene glycol and dimethyl terephthalate, polymerizing the reactant mixture can take two steps. In the first step, dimethyl terephthalate and excess ethylene glycol can be reacted in the melt at 150-200° C. with a basic catalyst to form bis(2-hydroxyethyl) terephthalate, which is then polymerized in the presence of a polymerization catalyst (e.g., $Sb_2O_3$) at higher temperature, e.g., 270° to 280° C. to form PET.

The PET compositions prepared by the methods described herein have a better dispersion of exfoliated h-BN in the polymer compared to those prepared by incorporation of h-BN in molten PET. The amount of exfoliated h-BN incorporated into the PET compositions disclosed herein varies according to the amount of h-BN in the reactant mixture. For example, in some embodiments, the exfoliated h-BN is present in an amount of about 0.01% to about 10% (e.g., about 0.01%, about 0.05%, about 0.1%, about 0.5%, about 1%, about 2%, about 3%, about 4%, about 5%, about 6%, about 7%, about 8%, about 9%, about 10%, or any ranges between the specified numeric values) by weight of the PET composition. It is believed that PET compositions containing about 0.01% to about 5% by weight the exfoliated h-BN are more useful in producing transparent material (e.g., transparent containers). Thus, in some embodiments, the exfoliated h-BN is present in an amount of about 0.01% to about 5% by weight of the PET composition. It is believed that PET compositions containing about 5% to about 10% by weight the exfoliated h-BN are more useful in producing opaque material (e.g., opaque containers). Thus, in some embodiments, the exfoliated h-BN is present in an amount of about 5% to about 10% by weight of the PET composition. Other suitable amounts of exfoliated h-BN are described herein.

In any of the embodiments described herein, the PET compositions do not contain any ingredient that can potentially leak into, for example, a carbonated beverage in an amount not generally regarded as safe for consumption by human.

Containers Prepared from Polymer Compositions Comprising Exfoliated h-BN

In one aspect, a container (e.g., a bottle) is prepared from the polymer composition comprising dispersed h-BN as described herein. In some embodiments, the container is prepared from a PET composition comprising dispersed h-BN as described herein. In some embodiments, the container is a PET bottle. In some embodiments, the PET bottle is a beverage bottle. In some embodiments, the container is prepared from a poly(m-xylylene adipamide) composition comprising dispersed h-BN as described herein. Methods for preparing a container from polymers are well known in the art. For example, injection stretch blow molding (ISBM) is commonly used to make PET bottles. One-piece PET containers having an integrated handle (handleware) are commonly formed using extrusion blow molding (EBM). See e.g., U.S. Pat. No. 8,771,583.

Addition of exfoliated h-BN to a polymer composition (e.g., a PET composition) creates torturous path for a gas (e.g., carbon dioxide in a carbonated drink) and therefore reduces gas permeability of the polymer composition. Thus, a container prepared from such polymer composition having dispersed exfoliated h-BN can have reduced gas egress or ingress from or to the container, which in turn can improve the shelf life of a product (e.g., a food item) within the container.

In one aspect, a method of reducing gas exchange between a sealed container and its external environment is provided. In some embodiments, the method comprises preparing the sealed container using a polymer composition comprising exfoliated h-BN as described herein. In some embodiments, the polymer is a homopolymer or copolymer of poly(ethylene terephthalate). In some embodiments, the sealed container is prepared from a material consisting essentially of the homopolymer or copolymer of poly(ethylene terephthalate) comprising exfoliated h-BN as described herein. In some embodiments, the polymer is a homopolymer or copolymer of poly(m-xylylene adipamide). In some embodiments, the sealed container is prepared from a material consisting essentially of the homopolymer or copolymer of poly(m-xylylene adipamide) comprising exfoliated h-BN as described herein.

Methods for determining gas exchange between a sealed container and its external environment are known in the art. For example, an oxygen permeability test can be used. Specifically, an oxygen permeability test can be conducted by comparing a sealed container prepared from the polymer composition (e.g., PET) comprising exfoliated h-BN with a substantially identical container except without the exfoliated hexagonal boron nitride. The test can be done, for example, by measuring oxygen permeability in cc/pkg/day, which stands for loss of cubic centimeter gas per day per package, for example, using a MoCon test equipment. In some embodiments, the oxygen permeability of the sealed container including exfoliated hexagonal boron nitride is reduced by about 10% or more (e.g., about 10%, about 15%, about 20%, about 25%, about 30%, about 40%, about 50%, about 60%, about 70%, about 80%, about 90%, about 95%, or any ranges between the specified numeric values) when compared to the oxygen permeability of a substantially identical container except without the exfoliated hexagonal boron nitride. In some embodiments, the container wall has an average thickness of about 0.1 mm to 1 mm (e.g., about 0.25 mm).

In one aspect, a method of increasing shelf life of a food item is provided. In some embodiments, the method comprises sealing the food item in a container, wherein the container is prepared using a polymer composition comprising exfoliated h-BN as described herein. In some embodiments, the polymer is a homopolymer or copolymer of poly(ethylene terephthalate). In some embodiments, the container is prepared from a material consisting essentially of the homopolymer or copolymer of poly(ethylene terephthalate) comprising exfoliated h-BN as described herein. In some embodiments, the polymer is a homopolymer or copolymer of poly(m-xylylene adipamide). In some embodiments, the container is prepared from a material consisting essentially of the homopolymer or copolymer of poly(m-xylylene adipamide) comprising exfoliated h-BN as described herein. In some embodiments, the container is a bottle. In some embodiments, the container is a beverage bottle. In some embodiments, the oxygen permeability of the sealed container comprising the food item is reduced by about 10% or more (e.g., about 10%, about 15%, about 20%, about 25%, about 30%, about 40%, about 50%, about 60%, about 70%, about 80%, about 90%, about 95%, or any ranges between the specified numeric values) when compared to the oxygen permeability of a substantially identical container except without the exfoliated hexagonal boron nitride. In some embodiments, the container wall has an average thickness of about 0.1 mm to 1 mm (e.g., about 0.25 mm).

Suitable food items includes any of those known in the art. In some embodiments, the food item is a liquid food item. In some embodiments, the food item is a solid food item.

In some embodiments, the food item is a soft drink. Suitable soft drinks include any of those known, for example, those are commercially available. In some embodiments, the food item is a carbonated soft drink. In some embodiments, the food item is non-carbonated soft drink. In some embodiments, the food item is a tea based drink.

In some embodiments, the food item is an alcoholic drink. In some embodiments, the alcoholic drink is a beer. Other suitable alcoholic drinks are known in the art.

In some embodiments, the food item is dairy product. In some embodiments, the dairy product is milk. Other suitable dairy products are known in the art.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

All of the various aspects, embodiments, and options described herein can be combined in any and all variations.

All publications, patents, and patent applications mentioned in this specification are herein incorporated by reference to the same extent as if each individual publication, patent, or patent application was specifically and individually indicated to be incorporated by reference.

What is claimed:

1. A method of preparing a polymer composition, the method comprising
   a) providing a reactant mixture comprising a first monomeric or oligomeric reactant and exfoliated hexagonal boron nitride; and
   b) polymerizing the first monomeric or oligomeric reactant in the reactant mixture to form the polymer composition that includes dispersed platelets of exfoliated hexagonal boron nitride;
   wherein the polymer is selected from the group consisting of polyesters, polyamides, polyimides, polyurethanes, polycarbonates, and mixtures and copolymers thereof.

2. The method of claim 1, wherein providing a reactant mixture comprises:
   exfoliating hexagonal boron nitride in a solvent to form a boron nitride suspension; and
   including the exfoliated boron nitride suspension in the reactant mixture.

3. The method of claim 2, wherein the solvent comprises the first monomeric or oligomeric reactant.

4. The method of claim 3, wherein the first monomeric or oligomeric reactant is selected from the group consisting of ethylene glycol, terephthalic acid, isophthalic acid, dimethyl terephthalate, diethyl terephthalate, cyclohexane dimethanol, an oligomer having Formula I,

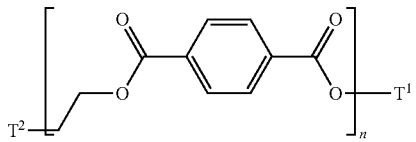

(Formula I)

wherein $T^1$ is H, methyl, ethyl, or 2-hydroxyethyl; $T^2$ is H, OH, or

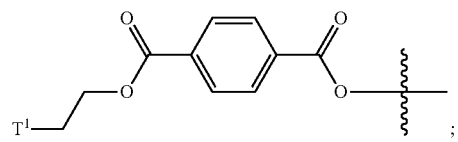

and n is 1-6;
and a combination thereof.

5. The method of claim 3, wherein the solvent is ethylene glycol and the polymer is homopolymer or copolymer of poly(ethylene terephthalate).

6. The method of claim 5, wherein the reactant mixture comprises the exfoliated boron nitride suspension in ethylene glycol, a terephthalic agent chosen from terephthalic acid, dimethyl terephthalate, or diethyl terephthalate, and a polymerization catalyst.

7. The method of claim 5, wherein the exfoliated hexagonal boron nitride forms platelets having an average thickness of 5 to 20 monolayers.

8. The method of claim 1, wherein the exfoliated hexagonal boron nitride has a mean aspect ratio of 100 to 2000.

9. The method of claim 6, further comprising adding a terephthalic agent to the solvent, after exfoliating the hexagonal boron nitride in the solvent.

10. The method of claim 1, wherein the exfoliated hexagonal boron nitride is present in an amount of 0.01% to 10% by weight of the polymer composition, wherein the polymer is a homopolymer or copolymer of poly(ethylene terephthalate).

11. A polymer composition produced by the method of claim 1.

12. A method of reducing gas exchange between a sealed container and its external environment, comprising preparing the sealed container using the polymer composition of claim 11, wherein the polymer is a homopolymer or copolymer of poly(ethylene terephthalate).

13. A method of increasing shelf life of a food item, comprising sealing the food item in a container, wherein the container is prepared using the polymer composition of claim 11, wherein the polymer is a homopolymer or copolymer of poly(ethylene terephthalate).

14. The method of claim 13, wherein the oxygen permeability of the sealed container comprising the food item is reduced by 10% or more when compared to the oxygen permeability in a substantially identical container except without the exfoliated hexagonal boron nitride.

15. The method of claim 13, wherein the food item is a carbonated soft drink, a tea drink, a dairy product, or an alcoholic drink.

16. A container prepared from a material consisting essentially of the polymer composition of claim 11, wherein the polymer is a homopolymer or copolymer of poly(ethylene terephthalate).

17. A reactant mixture comprising a first monomeric or oligomeric reactant, a second monomeric or oligomeric reactant, and exfoliated hexagonal boron nitride,
   wherein the first monomeric or oligomeric reactant forms a polyester upon polymerization, optionally with the second monomeric or oligomeric reactant,
   wherein the polyester is a homopolymer or copolymer of poly(ethylene terephthalate), poly(ethylene naphthalate) or poly(ethylene furanonate); and
   wherein the reactant mixture is substantially free of agglomerated hexagonal boron nitride as determined by scanning electron microscope.

18. The reactant mixture of claim 17, wherein the first monomeric or oligomeric reactant is ethylene glycol.

19. The reactant mixture of claim 17, wherein the second monomeric or oligomeric reactant is terephthalic acid, dimethyl terephthalate, or diethyl terephthalate.

20. The reactant mixture of claim 17, wherein the exfoliated hexagonal boron nitride is present in an amount of 0.01% to 10% by weight of the reactant mixture.

\* \* \* \* \*